United States Patent
Saarinen et al.

(10) Patent No.: US 6,220,283 B1
(45) Date of Patent: Apr. 24, 2001

(54) LOW SILHOUETTE POWER STEERING FLUID RESERVOIR

(75) Inventors: John E Saarinen, Washington; Lacramioara Romagnoli, Troy; Daniel Moy, West Bloomfield, all of MI (US)

(73) Assignees: DaimlerChrysler Corporation, Auburn Hills; TRW Inc., Sterling Heights, both of MI (US)

(*) Notice: Subject to any disclaimer, the term of this patent is extended or adjusted under 35 U.S.C. 154(b) by 0 days.

(21) Appl. No.: 09/504,701

(22) Filed: Feb. 16, 2000

(51) Int. Cl.$^7$ ....................................... E03B 3/18
(52) U.S. Cl. ............. 137/550; 137/565.19; 137/565.37; 137/574; 137/576
(58) Field of Search .................... 137/574, 576, 137/550, 565.19, 565.37

(56) References Cited

U.S. PATENT DOCUMENTS

| | | | |
|---|---|---|---|
| 2,975,801 | * 3/1961 | Kuypers et al. | |
| 3,993,094 | * 11/1976 | Spooner | 137/588 |
| 4,168,613 | * 9/1979 | Nakagawa et al. | 60/562 |
| 4,334,832 | 6/1982 | Brown et al. | 417/218 |
| 4,424,829 | 1/1984 | Millington et al. | 137/590 |
| 4,454,717 | * 6/1984 | Wade et al. | 60/453 |
| 4,517,083 | 5/1985 | Hayes et al. | 210/131 |
| 4,650,572 | 3/1987 | Hayes | 210/131 |
| 4,809,745 | * 3/1989 | Hormann | 137/574 |
| 5,513,490 | 5/1996 | Howell et al. | 60/327 |
| 5,820,356 | 10/1998 | Ogbuaku | 417/313 |
| 5,906,221 | * 5/1999 | Mancell | 137/549 |
| 5,918,760 | 7/1999 | Fodin et al. | 220/661 |

* cited by examiner

Primary Examiner—A. Michael Chambers
(74) Attorney, Agent, or Firm—Lawrence J. Shurupoff

(57) ABSTRACT

A reservoir for power steering fluid includes an upright housing that forms an upper interior space for storage of a reserve fluid supply, and a lower interior space containing a fluid filter.* Fluid connectors are provided** for causing fluid to flow in a circumferential swirling pattern as it moves through the filter, such that the flowing fluid has a relatively long residence time in the lower portion of the reservoir for achievement of an effective cooling action. The fluid filter is connected in a return line from the power steering unit to the associated pump, so that filtered liquid is supplied to the pump. The fluid filter is preferably a flat disk-like filter unit located in a horizontal plane between the inlet fluid connector and the outlet fluid connector. +L6 *The upper interior space and lower interior space containing a fluid filter are separated by a frusto conical partition. Residence of the fluid above the frusto conical partition allows air entrained in the fluid to escape. +L6 **below the frusto conical partition.

14 Claims, 1 Drawing Sheet

LOW SILHOUETTE POWER STEERING FLUID RESERVOIR

REFERENCE TO A RELATED PATENT APPLICATION

This invention is related to an invention shown and described in patent application Ser. No. 09/496,373 filed on Feb. 2, 2000. Certain concepts disclosed in that patent application are also used in the present invention.

BACKGROUND AND SUMMARY OF THE INVENTION

This invention relates to a power steering fluid system for an automotive vehicle, and particularly to a fluid reservoir incorporating a frusto conical partition for a power steering fluid system. The reservoir incorporates a filtration unit that is functionally located in the fluid return line from the power steering unit to the fluid pump that supplies pressurized fluid to the power steering unit. The reservoir is designed to have a relatively low silhouette, whereby the reservoir is adapted to fit in an engine compartment area that has a relatively small height dimension.

A typical power steering system for a motor vehicle includes a fluid pump for supplying pressurized fluid to a power steering unit that is connected to a return line that leads back to the pump. Often the fluid system includes a filter for trapping solid contaminants that can form during prolonged usage of the power steering system. The filter can be located in the pressure line between the pump and steering unit, or in the return line between the steering unit and the pump. In many non-sealed systems a reservoir is provided for supplying steering fluid to the system, and for accommodating excess fluid volumes associated with high fluid temperatures that occur in high temperature environments and/or cyclic operation of the power steering unit.

The present invention relates to a fluid reservoir for power steering fluid, wherein the reservoir which primarily incorporates a frusto conical partition and incorporates a filter that is functionally located in the return line between the power steering unit and the fluid pump. The reservoir is designed so that the fluid flowing through the filter is in a swirling condition, whereby heated fluid is mixed with relatively cool fluid so as achieve a reasonably even fluid temperature, without hot spots as might degrade the fluid or cause fluid foaming.

A particular aim of the invention is to provide a reservoir having a relatively small height dimension, whereby the reservoir can fit within small spaces in the vehicle engine compartment. Typically, the reservoir height dimension can be in the neighborhood of five inches.

Patents of prior art interest are U.S. Pat. No. 5,906,221 to M. Mancell, U.S. Pat. No. 5,820,356 to D. Ogbuaku, U.S. Pat. No. 4,650,572 to W. Hayes, and U.S. Pat. No. 5,918,760 to S. Frodin. The fluid reservoir of the present invention is advantageous over the prior art as regards compactness, good fluid mixing, seperation of aireated fluid, and low noise production. Circumferential swirling motion of the fluid is controlled with the aid of a frusto conical partition to prevent cavitation of the swirling fluid mass, and ingestion of air due to turbulence and vortex as might produce undesired noise.

Further features of the invention will be apparent from the attached drawings and description of an illustrative embodiment of the invention.

DESCRIPTION OF A PREFERRED EMBODIMENT OF THE INVENTION

Figure 1:
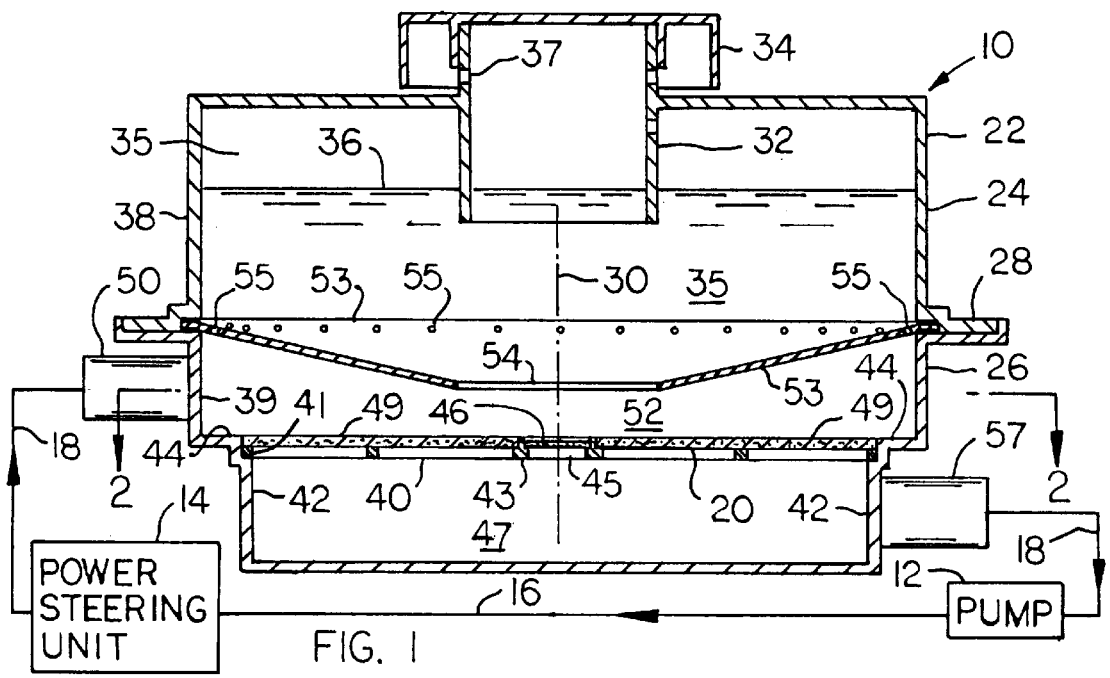
FIG. 1 is a section view taken through a fluid reservoir embodying the invention.
Figure 2:
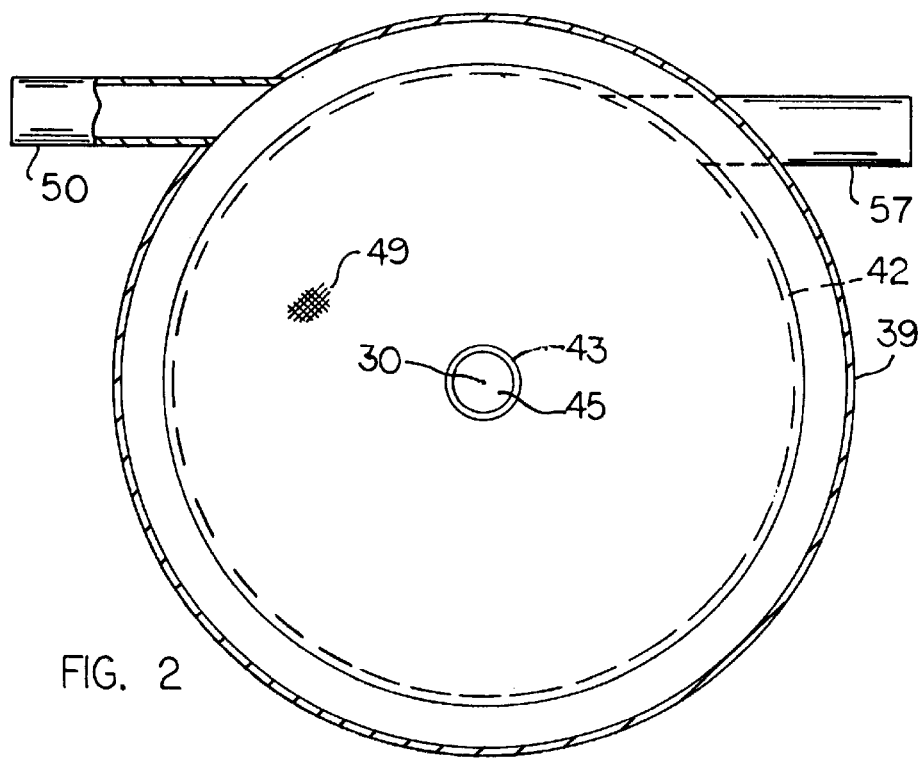
FIG. 2 is a transverse sectional view taken on line 2—2 in FIG. 1

Referring to FIG. 1 and 2, there is shown some features of a fluid reservoir embodying the invention. As schematically shown, fluid reservoir 10 is in circuit with a fluid pump 12 and power steering unit 14 of conventional design. The fluid circuit includes a high pressure line 16 for supplying fluid to power steering unit 14, and a return line 18 for returning depressurized fluid from the steering unit to pump 12. Reservoir 10 includes a filtration means 20 that is located in return line 18 for trapping contaminants that can accumulate in the fluid system. The present invention is concerned primarily with the construction of the reservoir and associated frusto conical partition 53, and filtration unit 20.

The illustrated reservoir includes an upright housing 22 defined by an upper housing member 24 and lower housing member 26. The two housing members have mating flanges 28 that are secured by any conventional means, e.g. bolts, clamps, weld etc. The two piece housing has a circular plan configuration centered on a central vertical axis 30.

Upper housing member 24 includes a filler tube 32 that is normally closed by a removable cap 34, such that replenishment fluid can be added to the system, e.g. when the fluid level in the reservoir interior space 35 falls significantly below a desired level, designated by numeral 36 in FIG. 1. An air vent opening 37 is provided in filler tube 32, or cap 34, to maintain space 35 at a desired pressure (i.e. normal atmospheric pressure). The side wall 38 of upper housing member 24 is preferably circular in the plan dimension.

The lower housing member 26 has a circular side wall having a stepped construction that includes a relatively large diameter circular side wall 39 and a relatively small diameter circular side wall 42 joined to wall 39 so as to form an upwardly facing internal ledge 44, whereby filtration unit 20 is spaced radially inwardly from side wall 39.

Upper housing member 24 serves as a fluid storage device for the reserve fluid supply required to keep the system in a filled condition. Excess fluid volumes associated with thermal fluid expansion can be accommodated by interior space 35 formed by housing member 24. Under low ambient temperature conditions, fluid can be supplied from interior space 35 to the system. The fluid in space 35 in usually relatively static (slow-moving).

Lower housing member 26 serves as a fluid housing for filtration means 20. The filtration means in a self-contained filtration unit that can be installed within housing member 26 as a unitary structure. The illustrated filtration means is preferably a flat disk-like filtration unit that includes a rigid support frame 40 and a porous filtration media 49 supported on the frame. The support frame can include an outer circular frame element 41 seated in a recess in ledge 44, an inner circular frame element 43, and plural radial spokes or an open grid work connecting the two circular frame elements. The central space 45 circumscribed by frame element 43 may be vacant.

Filtration media 49 can be an annular screen or other porous media having a depth dimension tending to prevent plug-up of the media after prolonged usage. The filtration media preferably has a porosity of at least forty microns, whereby minute solid particles are trapped on, or near, the upper surface of the filtration media.

In an alternate arrangement, central opening 45 can be occupied by a coarse filtration screen 46 adapted to trap relatively large contaminants (e.g. above 160 microns), while offering minimal resistance to liquid downflow from space 52 into space 47. The function of central opening 45, or the coarse filtration screen, is to provide a low flow resistance path around the filtration media 49, especially when the liquid is viscous and in a relatively motionless condition (at pump start-up).

The central relief opening 45 allows some liquid to bypass the filtration media 49. However, the non-filtered liquid flowing downwardly through relief opening 45 is only a fraction of the total liquid flowing from inlet 50 to outlet 57; most of the liquid is filtered. Over time most contaminants accumulating in the system are trapped on filtration media 49. Relief opening 45 functions as an anti-cavitation device by keeping space 47 filled with liquid during pump start-up, especially under low operating temperatures when the liquid can be so viscous as to be prevented from flowing easily through the filtration media.

Fluid is supplied to the filtration unit through a tubular inlet 50 that has a tangent connection with circular side wall 39, such that the incoming fluid flows along the interior surface of circular side wall 39 in a circumferential path concentric around the central vertical axis 30. Space above the filtration unit is fluid-filled. The swirling fluid in space 52 tends to climb up along the inner surface of circular wall 39 and the aligned surface of circular wall 39. The climbing action is controlled (or limited) by an annular frusto-conical partition 53 suitably mounted at the joint between walls 38 and 39. Partition 53 acts as a baffle or fluid containment wall. Vent ports 55 are formed in partition 53, whereby entrained air in the circumferentially-flowing stream is vented through ports 55 upwardly into the interior space 35. Boundary layer effects at the joint between partition 53 and the side wall 38 of the upper reservoir section tend to stagnate or slow the swirling fluid to enhance the de-aeration action. Ports 55 are preferably located at, or near, the highest point in space 52, which tends to concentrated the air near the ports.

Ports 55 are relatively small to minimize the flow of liquid through the ports. Size and number of ports are selected to minimize disturbances of fluid surface 36. The major percentage of liquid supplied to space 52 travels though filtration media 49, not the vent ports 55. However, some liquid up flow through the ports is not necessarily disadvantageous, in the heated liquid flowing upwardly through the ports mixes with the relatively cool liquid in space 35, thereby reducing the average temperature in the reservoir. Liquid flow through ports 55 may help to entrain air bubbles located on the undersurface of partition 53 near the ports. The frusto-conical shape of the partition is beneficial in that entrained air in the swirling stream tends to be concentrated on the undersurface of the partition so as to migrate or climb toward ports 55, rather than moving with the liquid through filtration media 49.

Frusto-conical partition 53 has a central opening 54 that allows free liquid communication between spaces 35 and 52. Liquid can flow upwardly from space 52 into space 35, or downwardly from space 35 into space 52, depending on different operating conditions.

Fluid is discharged from the lower housing member 26 through a tubular outlet 57 that is tangent to circular side wall 42. Pump 12 provides the impetus for fluid flow through filtration unit 20. A suction force generated by the pump is applied through tubular outlet 57 to the fluid in central space 47 (below the filtration unit) to produce a swirling motion in space 47. The tangential orientation of outlet 57 is a causative factor. The tangential orientation of tubular inlet 50 produces a circumferential swirling motion in space 52, such that the fluid flowing from inlet 50 to outlet 57 has an essentially continuous circumferential flow pattern around vertical axis 30.

Circumferential fluid flow through the reservoir is advantageous in that the fluid residence time is increased, so as to promote an extensive cooling action of the heated fluid introduced through inlet 50.

It will be noted that the central space 47 below the filtration unit 20 is in open communication with interior spaces 52 and 35. This is advantageous in that the fluid in space 35 can flow downwardly through opening 45 into space 47 to prevent cavitation in space 47. Especially at low ambient temperatures, the fluid in space 52 above the filtration unit may be relatively vicious so that inertia effects can delay the flow from space 52 across the filtration unit 20 into space 47.

Under such circumstances the pump suction might tend to produce cavitation in space 47. However, fluid in the upper storage space 35 and space 52 can readily flow into space 47 through central opening 45, to prevent such cavitation. Cavitation is detrimental for several reasons, including the fact that it produces an annoying audible sucking noise.

The illustrated reservoir construction achieves filtration of the fluid flowing from power steering unit 14 to pump 12 while at the same time prolonging the fluid residence time in the reservoir to promote a desired cooling action on the heated fluid. The relation between fluid storage space 35 and central space 47 prevents cavitation in space 47, especially during pump start-up.

Filtration media 49 preferably has a relatively small size porosity, in the neighborhood of at least forty microns. This enables the media to trap relatively small size contaminants.

The reservoir shown in FIG. 1 has a height dimension that is somewhat less than the diametrical dimension. The reservoir height dimension can be about five inch, while the diametrical dimension can be about six inch. With such proportioning, the reservoir can fit into small clearance spaces that would not accommodate a taller unit, while still providing access to cap 34 and filler tube 32. The relatively large diameter filtration unit 20 can have a reasonably large filtration media surface area without unduly increasing the height of the filtration unit or reservoir.

The small height dimension of the reservoir is made possible, partly by the fact that the inlet connection 50 and outlet connection 57 are horizontal and tangential to the housing side walls. The liquid flows into and out of the reservoir horizontally, so that chambers (spaces) 52 and 47 can have relatively small height dimensions, thereby reducing the overall height of the reservoir.

The illustrated construction achieves a relatively good mixing action of the liquid introduced through inlet connection 50 due to the high swirl rate and long liquid residence time in chambers 52 and 47. The reservoir functions as a cooler, as well as a filter and de-aeration mechanism.

While the drawings necessarily shows a specific embodiment of the invention, it will be realized that some variation in structure and arrangement can be made while still practicing the invention.

What is claimed is:

1. A reservoir for power steering fluid, comprising:
an upright housing having a vertical axis; said housing having an upper housing section defining an upper interior space adapted to store a reserve supply of fluid, and a lower housing section having fluid connections with a power steering unit and a fluid pump, whereby the pump moves fluid from the power steering unit through the lower housing section into the pump;

said fluid connections being configured to direct the fluid circumferentially around said vertical axis while the fluid is flowing within the lower housing section; a filtration means in said lower housing section for trapping solid contaminants;

said filtration means comprising a flat disk-like filtration unit located in a horizontal plane between said fluid connections.

2. The reservoir of claim 1, wherein said fluid connections comprises an inlet connection tangent to said first circular side wall, and an outlet connection tangent to said second circular side wall.

3. The reservoir of claim 1, wherein said lower housing section has a first circular side wall having a relatively large diameter, and second circular side wall having a relatively small diameter; said fluid connections comprising an inlet connection tangent to said first circular side wall, and an outlet connection tangent to said second circular side wall.

4. The reservoir of claim 1, wherein said lower housing section comprises a stepped wall structure that includes a first circular side wall having a relatively large diameter, and a second circular side wall having a relatively small diameter; said second circular side wall being located below said first circular side wall; said fluid connections comprising an inlet connection tangent to said first circular side wall, and an outlet connection tangent to said second circular side wall.

5. The reservoir of claim 4, wherein said filtration is unit concentric around said vertical axis; said filtration unit being supported on an annular ledge formed by said circular walls.

6. The reservoir of claim 1, wherein said filtration is unit concentric around said vertical axis; said filtration unit having a bypass opening allowing fluid to flow around said filtration unit.

7. The reservoir of claim 6, wherein said bypass opening is centrally located on said vertical axis.

8. The reservoir of claim 1, and further comprising an annular partition separating said upper interior space from said filtration means, whereby the fluid in said upper interior space is normally in a state static slow-flowing condition.

9. The reservoir of claim 8, wherein said partition comprises a frusto-conical wall extending outwardly and upwardly relatively to the housing vertical axis.

10. The reservoir of claim 9, and further comprising plural ports extending along the upper edge of said frusto-conical wall for venting air from said lower housing section into said upper interior space.

11. The reservoir claim 1, wherein said filtration means has a porosity in the range of forty microns.

12. A reservoir of power steering fluid, comprising:

an upright housing having a vertical axis; said housing comprising upper and lower housing sections having mating annular edges joined together along an interface; said upper housing section forming an upper interior space adapted to store a reserve supply of power steering fluid; said lower housing section comprising a stepped wall structure that includes a first circular side wall extending downwardly from said interface, and a second circular side wall located below said first side wall; said second side wall having a smaller diameter than said first side wall so that an annular ledge is formed at the juncture between said first and second circular side walls; a fluid inlet connection tangent to said first circular side wall for directing fluid from a power steering unit into said lower housing section; a fluid outlet connection tangent to said second circular side wall for directing fluid from the lower housing section to a pump that supplies fluid to the power steering unit; and a disk-like filtration means seated on said annular ledge for removing contaminants from the fluid flowing said inlet connection to said outlet connection.

13. The reservoir of claim 12, and further comprising an annular baffle means (53) for preventing incoming fluid in said lower housing section from swirling upwardly into said upper interior space.

14. The reservoir of claim 13 wherein said housing has a vertical height dimension and horizontal diameter dimension, said height dimension being slightly less than said horizontal dimension.

* * * * *